United States Patent
Brusilovsky et al.

(10) Patent No.: US 6,819,667 B1
(45) Date of Patent: Nov. 16, 2004

(54) PSTN-INTERNET NOTIFICATION SERVICES

(75) Inventors: Alec Brusilovsky, Naperville, IL (US); Vijay Kumar Gurbani, Lisle, IL (US); Ajay Jain, Aurora, IL (US); Douglas William Varney, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/368,985

(22) Filed: Aug. 5, 1999

(51) Int. Cl.[7] .................. H04L 12/64; H04L 12/66; H04M 1/64; H04M 3/42

(52) U.S. Cl. .............. 370/354; 370/356; 370/401; 370/466; 379/88.17; 379/215.01

(58) Field of Search ................ 370/259, 260, 370/352, 354, 356, 401, 465, 466, 467; 379/215.01, 88.17; 709/263

(56) References Cited

U.S. PATENT DOCUMENTS

| | | | | |
|---|---|---|---|---|
| 5,809,128 A | * | 9/1998 | McMullin | 379/215.01 |
| 6,078,581 A | * | 6/2000 | Shtivelman et al. | 370/352 |
| 6,144,644 A | * | 11/2000 | Bajzath et al. | 370/259 |
| 6,161,128 A | * | 12/2000 | Smyk | 709/205 |
| 6,226,373 B1 | * | 5/2001 | Zhu et al. | 379/207.02 |
| 6,243,374 B1 | * | 6/2001 | White et al. | 370/352 |
| 6,253,249 B1 | * | 6/2001 | Belzile | 709/249 |
| 6,298,062 B1 | * | 10/2001 | Gardell et al. | 370/401 |
| 6,353,611 B1 | * | 3/2002 | Norris et al. | 370/356 |
| 6,463,146 B1 | * | 10/2002 | Hartley et al. | 379/215.01 |

FOREIGN PATENT DOCUMENTS

| | | |
|---|---|---|
| EP | 0 794 650 | 9/1997 |
| EP | 0 856 981 | 8/1998 |
| WO | WO 97 31492 | 8/1997 |
| WO | WO 98 56133 | 12/1998 |

OTHER PUBLICATIONS

Schoen U et al. "Convergence Between Public Switching and the Internet" 1997 pp. 549–560.

Low C. "Integrating Communication Services" IEEE Communications magazine vol. 35 No. 6 Jun. 1, 1997 pp. 164–169.

* cited by examiner

Primary Examiner—Ahmed Elallam

(57) ABSTRACT

PSTN Internet Notification (PIN) services that can be provided as part of interconnecting IP and Public Switched Telephone Network (PSTN) systems with the intent of converging existing and creating new hybrid PSTN and IP services. PSTN Events Notification, based on well-defined PIN protocols, will promote interoperability of both the networks and systems built by different vendors.

18 Claims, 2 Drawing Sheets

PSTN-INTERNET NOTIFICATION SERVICES

CROSS-REFERENCE TO RELATED APPLICATION

This applicatioin claims priority of Provisional Application Ser. No. 60/120,604 which was filed Feb. 18, 1999.

TECHNICAL FIELD

This invention relates to public switched telephone network (PSTN) to internet services and more particularly to PSTN-Internet notification (PIN) services.

BACKGROUND

Telephone calls and telephone call services that are well known within the PSTN are starting to be available on communication systems that use both the PSTN and the Internet network as their telephone call transport media.

"Current telephone call services on the PSTN system and those available on the PSTN-Internet system are described in the articles: ITU-T Q.12 Recommendation Series, Geneva, 1995; I. Faynberg, L. R. Gabuzda, M. P. Kaplan, and N. J. Shah, "The Intelligent Network Standards and their Application to Services" McGraw-Hill, 1996; S. Petrack, "IP Access to PSTN Services: Basic Service Requirements, Definitions, and Architecture", Internet Draft; Handley, Schulzrinne, Schooler, and Rosenberg, "SIP: Session Initiation Protocol", Internet Draft; "Proposal for Internet Call Waiting Service using SIP; L. Slutsman, "Advanced Internet Caller ID Delivery Service" Internet Draft; and J. Rosenberg, H. Schulzrinne, "SIP For Presence", Internet Draft."

Those articles referred to as Internet-Drafts are working documents of the Internet Engineering Task Force (IETF), its areas, and its working groups. Note that other groups may also distribute working documents as Internet-Drafts. Internet-Drafts are draft documents valid for a maximum of six months and may be updated, replaced, or obsoleted by other documents at any time. It is inappropriate to use Internet-Drafts as reference material or to cite them other than as "work in progress." Copies of the above mentioned articles as of Feb. 18, 1999 will be available to establish the state of the art. The list of current Internet-Drafts can be accessed at http://www.ietf.org/ietf/1 id-abstracts.txt The problem of the telephone services referred to in the above articles is that they are just most rudimentary telephone services, while users and PSTN service providers and Internet service providers would like to provide the same telephone services on PSTN-Internet systems that are available on PSTN systems.

It is an object of this invention to provide advanced telephone services to PSTN-Internet system users.

It is another object of this invention to provide a method for enabling advanced PSTN-Internet services.

SUMMARY

In accordance with one aspect of the invention, the aforementioned object are achieved by providing a method for use with a communication system in which a set of PIN clients have subscribed to an incoming call notification event service having the subscription information saved in a database accessible to a service notification function unit (SNF) and a PIN server, comprising the steps of:

a. Calling party initiating a call that gets to a terminating switch (TS);

b. TS notifying a SNF entity of the system of this event and alerting Called Party in the normal manner of Called Party's telephone will ring on the Called Party's side;

c. SNF communicating to the PIN Gateway, passing the PIN Gateway the Calling Party's number, the Called Party's number, the time of day the call was received and other information related to the call, said communicating between the SNF and PIN Gateway occur using existing PSTN domain protocols;

d. PIN Gateway passing said information to the PIN Server using a PIN protocol.

e. PIN Server consulting the database to get the appropriate PIN Client's IP address; and f. PIN Server notifying the appropriate PIN Client of the Incoming Call; wherein communications between the PIN Server and PIN Clients use either PIN or some other relevant IP domain protocol.

In accordance with another aspect of the invention, the aforementioned objects are achieved by providing a method for use with a communication system in which a set of PIN clients have subscribed to a Voice Mail Arrival Event service having the subscription information saved in a database accessible to the SNF and the PIN server, comprising the steps of:

a. Calling party initiating a call that gets to the Terminating Switch (TS);

b. The TS notifying SNF entity of the system of this event and alerting Called Party in the normal manner of Called Party's telephone will ring on the Called Party's side and the call will be forwarded to a voice mail system;

c. SNF communicating to the PIN Gateway, passing the PIN Gateway the Calling Party's number, the Called Party's number, the time of day the call was received and other information related to the call, said communicating between the SNF and PIN Gateway occur using existing PSTN domain protocols;

d. PIN Gateway passing said information to the PIN Server using a PIN protocol.

e. PIN Server consulting the database to get the appropriate PIN Client's IP address; and f. PIN Server notifying the appropriate PIN Client of the Incoming Call; wherein communications between the PIN Server and PIN Clients use either PIN or some other relevant IP domain protocol.

TABLE OF ABBREVIATIONS

CPL Call Processing language
DN Destination Number
ICW Internet Call Waiting
IN Intelligent Network
NPL Notification Processing Language
PINT PSTN Internet Interworking Group PSTN Public Switched Telephone Network
SCP Service Control Point
SIP Session Initiation Protocol
SN Service Node
VoIP Voice over IP (Internet Protocol)

DETAILED DESCRIPTION

Figure 1:
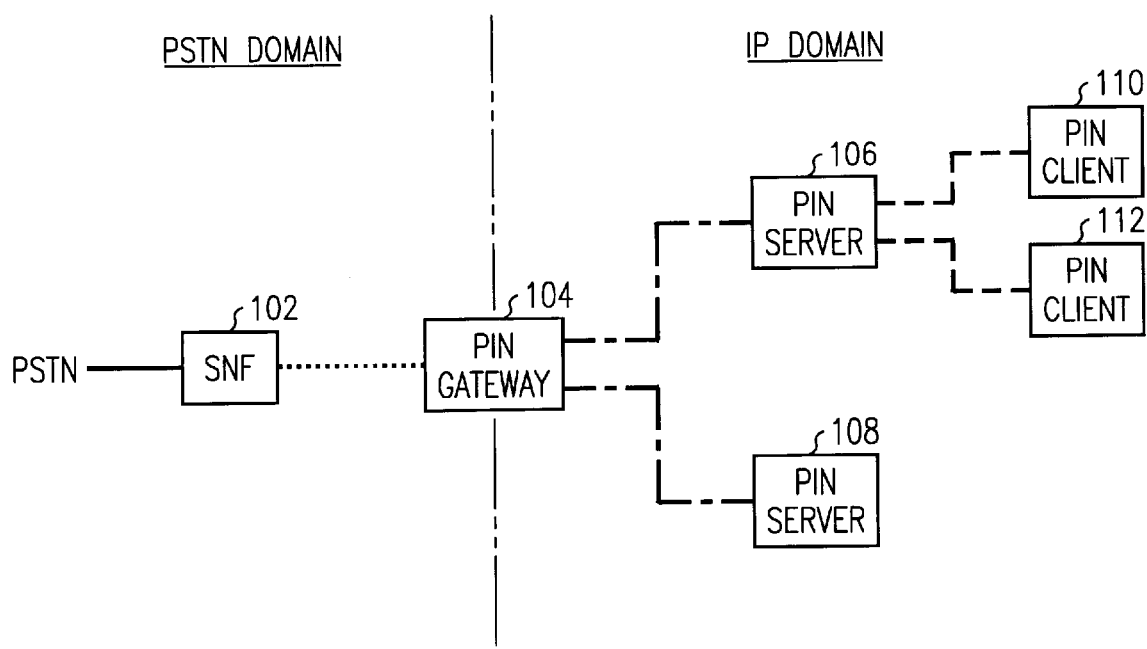
FIG. 1 is a simplified block diagram of a PSTN-Internet system useful for practicing the invention.

Referring now to FIG. 1, a representative network is shown. PSTN-Internet notification (PIN) services will be described. In order to provide interoperability between PSTN and IP networks, it is very important to ensure notification of the IP network portion of the PSTN-Internet system of the events happening in the PSTN portion. PSTN events of which the Internet portion needs to be notified can be grouped into two categories:

Category I: Basic events

1. Phone off-hook.
2. Phone on-hook.
3. Voice-mail Arrival.
4. Incoming Call Notification (Attempt to Terminate Call). and

Category II: Advanced events

1. Attempt to dial number (specific event can be Attempt to Dial ISP Number.
2. Dropping Dialed Connection (i.e. dropping ISP call).
3. ISP Connection Made.
4. Attempt to Forward Call (forwarded end point could easily be VoIP terminal).
5. Attempt to Subscribe/Unsubscribe for a PSTN Service (i.e. Set Up Call Forwarding).
6. Attempt to Enter Conference.
7. Attempt to Exit Conference.
8. Identification of the Speaker (talking party) to the other participants of the Voice (or multimedia) Conference.

The Basic events have been well known in the PSTN network for a long time. The Advanced events have some that have been known for a long time, such as Attempt to Forward Call. These known Advanced events will take on a broader meaning when they can and do refer to PSTN-IP calls in addition to PSTN-PSTN calls. Other Advanced events did not exist until PSTN-IP calls made them possible, such as the ISP Made event. PSTN events are important because they are include data upon which services are built and operate.

Some examples of services that are based on PIN of PSTN events, or use PIN of PSTN events as one of the building blocks thereof are:

1. Internet Call Waiting. ICW is the capability to provide incoming call notification and completion options when the Subscriber is on a dial-up IP connection.
2. Internet Call Management. PSTN call notification and control options (flexible call screening, forwarding, etc.), delivered to an IP client.
3. Internet Conference Management. PSTN Teleconference notification and management from an IP Client
4. Internet Conference Mediation. Pre-Teleconference (before an actual connection is made) management service from an IP client.
5. Advanced Caller ID Delivery: Ordered incoming call notification to multiple Subscriber's dial-up IP connections.
6. Queue Management. Notification of the status and events of the call queue, much needed for the IP-based Call Center Control.
7. Call Progress Delivery as part of PINT services. Classic PINT services need notification of the Call Progress.
8. Internet Call Routing (ICR). Flexible routing and control over a dial up PSTN call from an IP host.

Thus, in support of call feature services that PSTN customers are familiar with, in an IP portion of a PSTN-IP network, a method for transmitting PSTN events to an IP portion of a PSTN-IP network and use of those events in the IP portion, such as that provided by the present invention, was needed.

Architecture of the Invention

With the proliferation and wide acceptance of the Internet, and more so with the convergence of the Internet and PSTN, e.g. system 100, there is an increasing desire for events occurring on the PSTN domain to be propagated to the Internet domain. A PIN protocol transmitting notifications of PSTN events to the Internet domain fills this need. Entities on the Internet domain can receive the events generated by the PSTN domain and act appropriately. The major entities of the PIN services and protocol are the PIN gateway 104, the PIN servers 106, 108 and various PIN clients 110, 112, as depicted in FIG. 1 which illustrates a functional scalable architecture that will support PIN Services.

FIG. 1 Legend:
  SNF—Service Notification Function unit 102
  .-.—PIN Protocol
  -----—PIN Protocol or Standard Client Server Protocol
  ...—Standard PSTN/SS7/IN Protocol A Service Notification Function (SNF) unit 102 is located in PSTN domain. SNF 102 may physically reside in IN elements (e.g. be a part of SCP, SMS, or SSP) that are specialized servers. Alternatively SNF 102 may be connected to telephone switches and other PSTN elements (not shown in FIG. 1). PSTN informs SNF 102 and PIN Gateway 104 of PSTN events utilizing traditional protocols (SS7/IN) PIN Server provides Subscription for Notification Services and aggregates Notification Services for PIN Clients 110, 112. PIN protocol is a specialized protocol used for communication between the PIN gateway and PIN servers, as well as between PIN servers and PIN clients. PIN protocol communicates specific PIN messages. It must be a real time protocol in order to support the call feature services. One embodiment of the present invention uses standard SNMP (simple network management protocol) as the PIN protocol. Another embodiment uses SIP (session initiation protocol) as the PIN protocol. Other protocols are contemplated for use as a PIN protocol, but as of this time they are not completed. The PIN messages that the PIN protocol carries include fields for at least the following information fields:

Calling Number
  Called Number
  Caller Name
  Event Type (like on-hook, off-hook, ISP number recognition, etc.)
  Call treatment (priority call, QoS, etc.)
  Charge rate
  Charge type (credit card, operator assisted, collect call, etc.)
  Timestamp
  Call disposition (terminated by VoiceMail system, answering machine, modem, pager, etc.)

The present invention uses PIN Protocol to communicate event information from PIN Gateway 104 to PIN Servers 106, 108 and from PIN Servers 106, 108 to PIN Clients 110, 112. The invention also uses the Notification Processing Language (NPL), which has a current status but is also evolving according to the actions of the IPTEL Working Group industry group. NPL also is used for defining connections of the Basic Notification Services to the PSTN Call states. NPL facilitates the building of new Notification Services and provides means to describe Notification Filters for Notification screening. An example of a Notification Filter is: Notification for an Attempt to Enter Conference from a predefined number in the hours 9 through 17 only on weekends and holidays.

Figure 2:
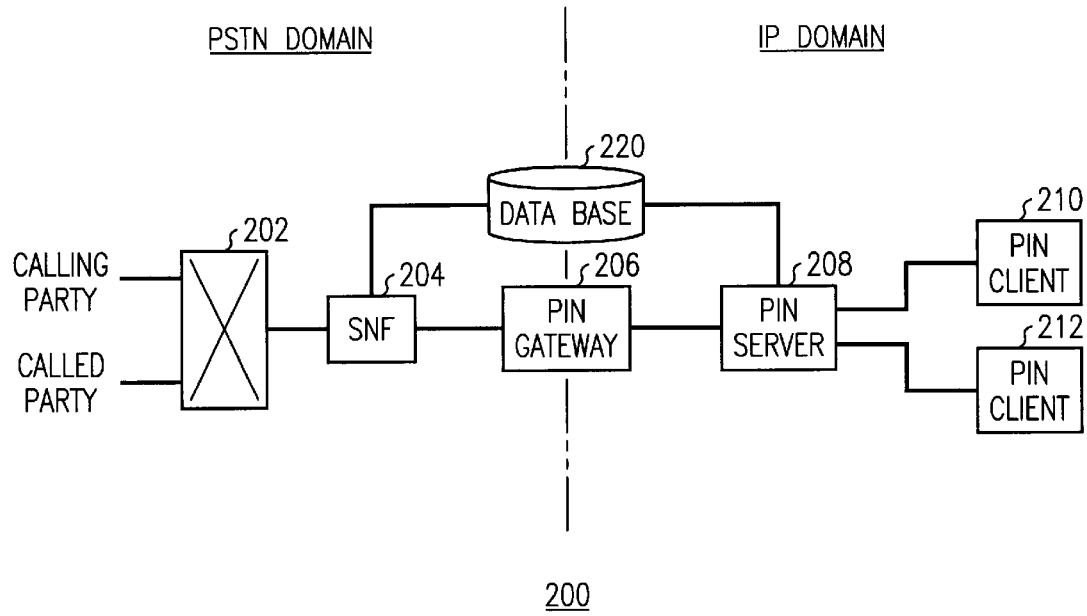
FIG. 2 is a flow diagram of an incoming call notification event service on a PSTN-Internet system.
Figure 3:
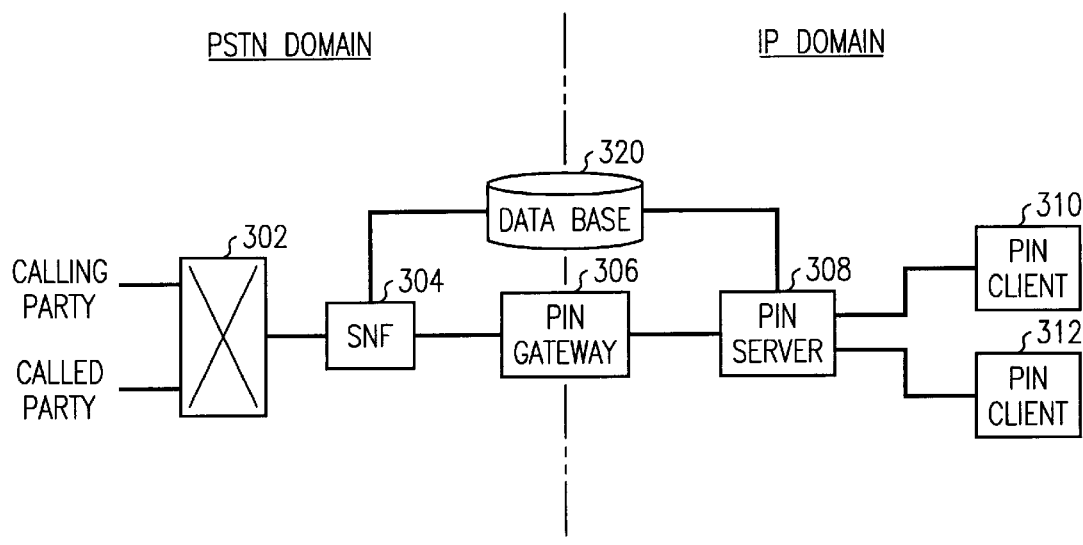
FIG. 3 is a flow diagram of a voice mail arrival event service on a PSTN-Internet system.

Referring now to FIGS. 2 and 3, the systems 200 and 300 respectively have SNFs 204, 304 that are respectively connected to terminating switches 202, 302; PIN Gateways 206, 306; and databases 220, 320. The databases 220 and 320 are designed with essential database schema:

Subscribed PIN client's profile table;

Client identification;

IP address(es);

authentication information (including public/private keys, if needed); and set of interested PIN event(s)

Please note, this is not an exhaustive list of database fields and schema, but does represent the minimum needed to implement PIN services of the present invention.

Examples of PIN Services

Service 1: Incoming Call Notification Event. Scenario: A set of PIN clients want to know, in real time, all incoming calls for a particular PSTN number is shown in FIG. 2. In FIG. 2 the system 200 has a set of PIN clients that are subscribed to Incoming Call Notification Event. This subscription information is saved in a database 220 that is accessible to the SNF and the PIN Server.

Step 1: Calling party initiates a call that gets to the Terminating Switch (TS) 202.

Step 2: The TS 202 notifies the SNF entity 204 of this PSTN event. The Called Party is alerted in the normal manner (i.e. the phone will ring on the Called Party's side).

Step 3: SNF 204 communicates to the PIN Gateway 206, passing it the Calling Party's number, the Called Party's number, the time of day the call was received and any other pertinent information. Communications between the SNF 204 and PIN Gateway 206 occur using existing PSTN domain protocols (SS7, IN).

Step 4: PIN Gateway 206 passes this information to the PIN Server 208 using a PIN protocol (e.g. SIP or SNMP).

Step 5: PIN Server 208 consults a database 220 to get an appropriate PIN Client's IP address.

Step 6: PIN Server 208 notifies the appropriate PIN Client 210 or 212 of the Incoming Call. Upon receiving notification of a PSTN event, the PIN client may handle the notification of the PSTN event internally. The PIN client may handle the PSTN event by emitting an audible signal, emitting a visible signal, or by logging the notification to a disk file."

After the incoming call is established, communications between the PIN Server 208 and PIN Client 210 or 212 may use PIN or some other relevant IP domain protocol.

Service 2: Voice Mail Arrival Event. Scenario: A set of PIN clients 310 and 312 want to know, in real time, all the calls that went to voice mail box for a particular PSTN number (as shown in FIG. 3). In FIG. 3, a system 300 has a set of PIN clients 310, 312 that are subscribed to the Voice Mail Arrival Event. This subscription information is saved in a database 320 that is accessible to the SNF 304 and the PIN Server 208.

Step 1: Calling party initiates a call that gets to the Terminating Switch (TS) 302.

Step 2: The TS 302 notifies the SNF entity 304 of this PSTN event. The Called Party is alerted in the normal manner (i.e. the phone will ring on the Called Party's side, and the call will be forwarded to a voice mail system). Note that, alternatively, the voice mail system can also notify the SNF 304 of this event. In the diagram above, however, the TS 302 is shown notifying the SNF 304 of this event.

Step 3: SNF 304 communicates to the PIN Gateway 306, passing to PIN Gateway 306 the Calling Party's number, the Called Party's number, the time of day the call was received and any other pertinent information. Communications between the SNF 304 and PIN Gateway 306 occur using existing PSTN domain protocols (SS7, IN).

Step 4: PIN Gateway 306 passes this information to the PIN Server 308 using a PIN protocol (e.g. SIP or SNMP).

Step 5: PIN Server 308 consults the database 320 to get an appropriate PIN Client's IP address.

"Step 6: PIN Server 308 notifies the appropriate PIN Client 310 or 312 of the Incoming Call. Upon receiving notification of a PSTN event, the PIN client may initiate a process to handle the notification of the PSTN event. The PIN client may initiate an email client process or initiate a short messaging client process for notifying a short-messaging endpoint unit that may comprise a pager, cellular telephone, or a personal communications system. The PIN client may initiate a process to handle the notification of the PSTN event by initiating a facsimile delivery to a PSTN endpoint process."

After the incoming call is established, communications between the PIN Server 308 and PIN Client 310 or 312 may use PIN or some other relevant IP domain protocol.

Other PIN services similar to these are possible by this invention. For example:

Security Considerations

PIN communications between the PIN Client, PIN Server, PIN Gateway and the SNF may travel over the Internet. Thus it is essential to provide encryption for the communications. In addition to encryption, it is also necessary to provide authentication of both the end points; i.e. SNF and PIN Client. PIN security has to authenticate both end points and if the authentication succeeded, encrypt the communications.

PIN Security Requirements are, similar to PINT Security Requirements outlined in the articles mentioned above. They include:

Peer entity authentication to allow a communicating entity to prove its identity to another in the network.

Non-repudiation to account for all operations in case of doubt or dispute. This could be achieved by logging all the information pertinent to the transaction. In addition, the PSTN network will maintain its own account of the transaction for generating bills.

Confidentiality to avoid disclosure of information without the permission of its owner. Although this is an essential requirement, it is not particular to the proposed project.

PIN Client profile verification to verify if the end user is authorized to use a service.

In the course of the development, additional requirements are likely to arise and many more specific security work items are likely to be proposed and implemented.

Some of the PIN-specific security considerations:
- Cracking is a threat to any Service Provider (PSTN, Intranet, Internet). It is real danger—phone companies are common targets
- Notification spoofing is one of the threats
- Existing mechanisms applied to the Internet can be implemented
- Stealing a Notification is a new type of security threat As can be appreciated, security is an important part of PSTN-Internet communications and thus an important part of PIN services.

Although this invention has been described with respect to a preferred embodiment, those skilled in the art may devise numerous other arrangements without departing from the scope of the invention as defined in the following claims.

We claim:

1. A method for use with a communication system in which a plurality of PSTN-Internet Notification clients have subscribed to an incoming call notification event service having the subscription information saved in a database accessible to a Service Notification Function (SNF) entity and a PSTN-Internet Notification (PIN) server, comprising the steps of:
   a. a Calling Party initiating a call to a Called Party supported by a terminating switch (TS);
   b. said TS notifying said SNF entity of this event and the TS continuing to process the call to a Called Party in the normal manner including ringing the Called Party's telephone at a Called Party's terminal equipment if the Called Party's telephone is not busy;
   c. said SNF entity communicating to a PIN Gateway at least a number of the Calling Party and a number of the Called Party, said communicating between the SNF and PIN Gateway effected using a PSTN domain protocol;
   d. the PIN Gateway passing said number of the Calling Party and said number of the Called Party to the PIN Server using a PIN protocol;
   e. saving subscription information for subscribers in a database that is accessible to the SNF and the PIN Server;
   f. the PIN Server consulting the database to get an IP address of the subscriber; and
   g. the PIN Server notifying the subscriber of the Incoming Call; wherein communications between the PIN Server and subscribers use an IP protocol.

2. The method of claim 1, wherein in step (c) a time of day the call is received and communicated between the SNF and PIN Gateway also using a PSTN domain protocol, and in step (d) the time of day the call is received and communicated to the PIN Server using a PIN protocol.

3. The method of claim 2, wherein said IP protocol is a PIN protocol.

4. The method of claim 2, wherein said IP protocol is an IP domain protocol.

5. The method of claim 1, wherein said IP protocol is a PIN protocol.

6. The method of claim 1, wherein said IP protocol is an IP domain protocol.

7. The method of claim 1, wherein said PIN client upon receiving notification of a PSTN event handles said notification of a PSTN event internally.

8. The method of claim 7, wherein said PIN client handles said PSTN event by emitting an audible signal.

9. The method of claim 7, wherein said PIN client handles said PSTN event by emitting a visible signal.

10. The method of claim 7, wherein said PIN client handles said PSTN event by logging the notification to a disk file.

11. The method of claim 1, wherein said PIN client upon receiving notification of a PSTN event initiates a process to handle said notification of a PSTN event.

12. The method of claim 11, wherein said process said PIN client initiates one of an e-mail client process and a short messaging client process for notifying a short-messaging endpoint unit.

13. The method of claim 12, wherein said short-messaging endpoint unit is one of a pager, a cellular telephone, and a personal communication system.

14. The method of claim 11, wherein by said process said PIN client initiates is one of a voice delivery to a PSTN endpoint process, and a facsimile delivery to a PSTN endpoint process.

15. The method according to claim 1, further comprising the step of:
   g. said PIN client operating as a proxy to communicate the notification of said incoming Call to a further network entity.

16. The method of claim 1 wherein the saving of subscription information for subscribers comprises storing a set of PIN events in which the subscriber is interested.

17. The method of claim 1 wherein the saving of subscription information for subscribers comprises storing a profile table for the subscribers.

18. The method of claim 1 wherein the saving of subscription information for subscribers comprises storing client identification information.

* * * * *